April 1, 1958  C. W. CHENEY  2,828,524
WORM GEARED BAND CLIPS
Filed May 11, 1954
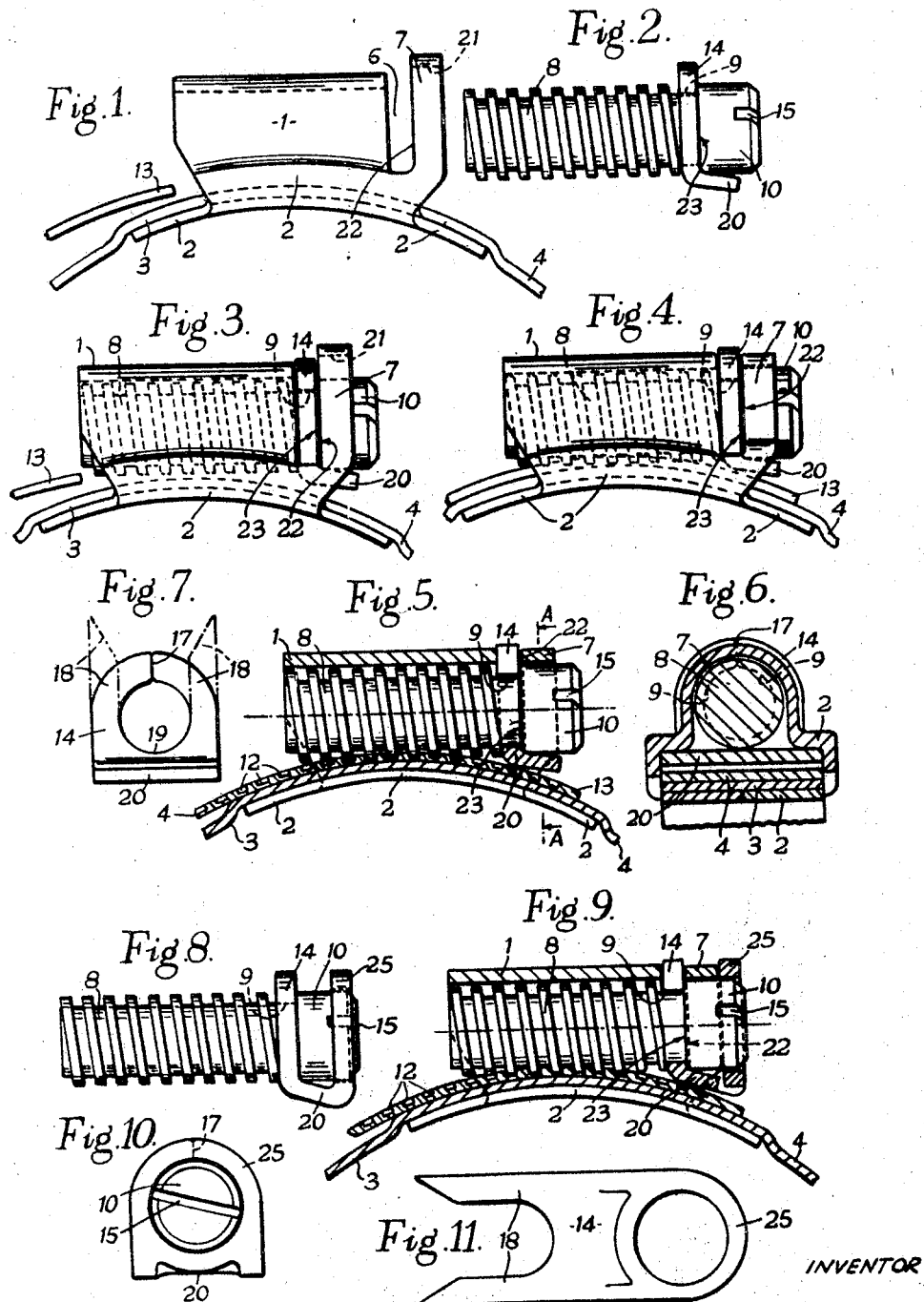
INVENTOR
Charles William Cheney
BY
ATTORNEYS United States Patent Office 2,828,524
Patented Apr. 1, 1958

2,828,524
WORM GEARED BAND CLIPS
Charles William Cheney, Birmingham, England
Application May 11, 1954, Serial No. 429,046
5 Claims. (Cl. 24—274)

This invention relates to a worm-geared band clip or pipe clip and is a development of the invention disclosed in the specification of my Letters Patent No. 2,477,045 in which a worm is journalled in a housing to which an end-part of a flexible metal band member is secured whereas the other free end of the band member is formed circumferentially with transverse teeth for engagement with the worm threads, the said worm having an annular neck adjoining its head end and a gapped abutment washer is closed on to the neck so as to permit the rotation of the worm and is arranged in a transverse gap in the housing.

In the mass assembly of such band or pipe clips which is normally carried out by unskilled labour, the worm is inserted in the housing with the annular neck in register with the transverse gap and the abutment washer, in its open state, is placed around the annular neck and then closed inwardly around said neck by means of pressing tools capable of exerting a contracting action on the washer. One of the difficulties arising from this is that it is not possible to ensure that the closing of the washer has been carried out effectively, because the joint cannot be inspected as it lies at the base of the neck and with small sizes of band clips, the difficulty is even more pronounced.

It will be appreciated that the efforts exerted by different operators in closing the washer around the neck will vary since one will exert a greater force on the tools than another with the result that some washers will be fully or over closed whereas others will be improperly closed.

According to the present invention the head end of the housing is expanded to admit a pre-assembled washer and worm unit into the housing with the washer aligned with said gap, and the said expanded end is contracted so as to form an abutment for the outer face of the washer and prevents axial displacement of the unit in one direction.

The invention also consists in a method of manufacturing a worm-geared band clip having a transverse gap in the head end of the housing and which consists in inserting a pre-assembled washer and worm into the housing from an expanded head end of the latter, aligning said washers with said gap, and in contracting the expanded end of the housing so that it lies in a position behind the outer face of the washer and forms an abutment therefor and prevents axial displacement of the unit in one direction.

The invention will now be described with reference to the accompanying drawings which illustrate, by way of example, two constructions of band clips:

Fig. 1 is a side elevation of the housing and band, the latter being broken away for clarity.

Fig. 2 is a side elevation of the worm and washer unit.

Fig. 3 is a side elevation illustrating the unit of Fig. 2 admitted into the housing of Fig. 1.

Fig. 4 is a side elevation similar to Fig. 3 and illustrating the unit assembly workably secured in the housing and the band in engagement with the worm.

Fig. 5 is a longitudinal section of Fig. 4.

Fig. 6 is a section of Fig. 5 taken on dotted line A—A.

Fig. 7 is an end view of the washer used in the construction of Figs. 1 to 6.

Fig. 8 is a side elevation of a worm and washer unit according to a modification.

Fig. 9 is a longitudinal section of the unit, Fig. 8, workably secured in the housing, similar to Fig. 5.

Fig. 10 is an end view of Fig. 9.

Fig. 11 is a plan of a blank prior to its formation into the washer of Figs. 8 to 10.

In the drawings and with reference to Figs. 1 to 6, it will be seen that the band clip comprises a tubular housing 1, made of sheet metal which is open at both ends and has a saddle part 2 secured to one end 3 of a flexible metal band 4. The saddle part 2 is provided at its base with wings which are bent inwardly and welded to the underside of the end 3 so that the housing 1 is rigidly attached to the latter.

The housing 1 has a transverse gap 6 adjoining its head end 7 and receives a worm 8 provided with an annular neck 9 and a head 10. The worm 8 co-axially engages the housing 1 and its threads 11 tangentially engage a line of transverse teeth 12 extending from the free end 13 of the band 4 for the purpose of traversing the band in the tightening or loosening sense, dependent upon the direction of rotation of the worm 8. The worm 8 is retained in the housing 1 against axial displacement in either direction by means of an abutment washer 14 which is closed onto the annular neck 9 in a manner permitting the free rotation of the worm 8. In the assembled position as seen at Figs. 5 and 6, the opposite faces of the washer 14 can abut against the housing 1 at two positions flanking the gap 6 for preventing axial displacement of the worm 8 in either direction, i. e. when the band is under closing stress or is being released; the washer 14 also operates to prevent the worm becoming detached from the housing when the free end 13 of the band 4 is not engaged with the worm threads.

The gapped washer 14 and the worm 8 are pre-assembled as a unit for application to the housing 1. As will be seen at Fig. 7, the crown of the washer has a butt joint 17 formed by closing the wings 18 inwardly, whereas the base 19 is solid and has an inclined base flange 20 to engage the free end of the band as disclosed in the specification of our Letters Patent Number 2,650,405. The head end 7 of the housing 1 is expanded (Figs. 1 and 3) relative to the remainder so as to form a narrow arch rising from the base of the housing, the opening in the bore 21 being sufficiently wide to admit freely the passage of the washer into alignment with the transverse gap 6. The expanded head end 7 is contracted so that its flanking face 22 lies or seats itself behind the outer face 23 of the washer 14 and forms an abutment which extends for at least half of an imaginary circle or surface contact. The closed head end 7 also lies over the head 10 of the worm 8 and permits the head to rotate freely. It will be appreciated that the joint 17 is readily visible before assembly of the unit with the housing so that greater precision and accuracy in the finished article is possible.

Referring now to Figs. 8–11, the abutment washer 14 has an inclined base flange to frictionally engage the band under tightening stress so as to obtain an additional safety grip as in specification of our Letters Patent Number 2,650,405 and is provided at a rear position with an integral, co-axial ring 25 which loosely surrounds the head 10 of the worm 8 and operates as a shroud for use in retaining the tip of a screw driver in engagement with the nick 15 in the head 10 of the worm during its tightening and releasing movements.

Again the joint 17 of the gapped abutment washer 14 is at the crown thereof and is readily visible prior to the unit being admitted into the housing 1.

The advantages to be obtained by the invention are that the washer 14 is secured in the housing gap 6 by the head end 7 of the housing 1; the washer 14 is given a substantial degree of solidarity by the abutting end of the housing 7; the effective closing of the washer 14 on the annular neck 9 is visible prior to assembly of the worm 8 with the housing 1 and the unit worm and washer make for easier assembly of the article.

I claim:

1. In a worm gear band clip, the combination of an operationally rigid elongated worm housing adapted to be fixed to one end of a band member and to receive the other end thereof which is provided with headed worm teeth, a worm disposed with its threaded part in said housing and being provided intermediate its head rearward of the longitudinal portion thereof where its thread engages the worm teeth with a circular neck of less diameter than that of the worm thread, said neck being aligned with a transverse gap provided in said housing and a gapped abutment washer closed around the neck of the worm with sufficient play to permit rotation of said worm in said washer and projecting radially into said gap for co-operation with at least one side wall of the latter to transmit axial stresses acting on said worm in at least the band tensioning direction to said housing, characterised in that the one end of the housing is deformable to provide a relatively greater size opening prior to assembly of the band clip which will admit thereinto the said worm and the said washer as a preassembled unit with said washer aligned with the said transverse gap, and deformable to hold the said washer within the said gap after assembly.

2. A band clip according to claim 1, wherein said deformable end of said housing is initially formed into an arch-like configuration for the entry of the unit.

3. A band clip according to claim 1, in which the end of the housing opposite said deformable end extends for at least one half of an imaginary circle surface area of contact.

4. A band clip according to claim 1, wherein the washer is provided with a base flange.

5. A band clip according to claim 1, wherein the washer is further provided with a coaxial ring portion surrounding the head of the worm.

References Cited in the file of this patent

UNITED STATES PATENTS

| | | |
|---|---|---|
| 1,986,748 | Pritchard | Jan. 1, 1935 |
| 2,384,094 | Jamie | Sept. 4, 1945 |
| 2,477,045 | Cheney | July 26, 1949 |
| 2,650,407 | Cheney | Sept. 1, 1953 |

FOREIGN PATENTS

| | | |
|---|---|---|
| 536,267 | Great Britain | May 8, 1941 |